(12) United States Patent
Kim et al.

(10) Patent No.: US 11,962,723 B2
(45) Date of Patent: Apr. 16, 2024

(54) PACKET TELEPHONY TERMINAL APPARATUS AND OPERATING METHOD THEREOF

(71) Applicant: ELECTRONICS AND TELECOMMUNICATIONS RESEARCH INSTITUTE, Daejeon (KR)

(72) Inventors: Do Young Kim, Daejeon (KR); Namseok Ko, Daejeon (KR); Sun Me Kim, Daejeon (KR); Taesik Cheung, Daejeon (KR); Yoo Hwa Kang, Daejeon (KR); Tae Kyu Kang, Daejeon (KR); Jeong-Dong Ryoo, Daejeon (KR); Yeoncheol Ryoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 254 days.

(21) Appl. No.: 17/582,277

(22) Filed: Jan. 24, 2022

(65) Prior Publication Data

US 2022/0239782 A1 Jul. 28, 2022

(30) Foreign Application Priority Data

Jan. 27, 2021 (KR) .................. 10-2021-0011392

(51) Int. Cl.
*H04M 1/64* (2006.01)
*H04M 7/00* (2006.01)
*H04M 7/06* (2006.01)

(52) U.S. Cl.
CPC ......... *H04M 7/0081* (2013.01); *H04M 7/066* (2013.01)

(58) Field of Classification Search
CPC ........................... H04M 7/0081; H04M 7/066
See application file for complete search history.

(56) References Cited

U.S. PATENT DOCUMENTS 7,907,523 B2 3/2011 Koo et al.
10,542,537 B2 1/2020 Kim et al.
(Continued)

FOREIGN PATENT DOCUMENTS

KR 10-0903113 B1 6/2009
KR 10-2012-0033847 A 4/2012

OTHER PUBLICATIONS

Kang, T. K., et al. "Research Trend in Ultra-Low Latency Networking for Fourth Industrial Revolution." Electronics and Telecommunications Trends 34.6 (2019): 108-122, (Abstract in English, 15 pages in Korean).

*Primary Examiner* — Simon King
(74) *Attorney, Agent, or Firm* — NSIP Law

(57) ABSTRACT

A method in which a high-quality packet telephony terminal apparatus performing low-latency and lossless packet communication with a counterpart packet telephony terminal apparatus operates in an integrated network structure in which a time sensitive network (TSN) and a packet communication network are combined may be disclosed. The packet telephony terminal apparatus may perform packet telephony call processing, perform a TSN stream reservation procedure when the counterpart packet telephony terminal apparatus is capable of performing a TSN function for lossless packet communication, adjust a size of a dejitter buffer when the TSN stream reservation procedure is successful, and perform low-latency packet telephony communication through the minimized size of the dejitter buffer.

19 Claims, 5 Drawing Sheets

(56) References Cited

U.S. PATENT DOCUMENTS

| | | |
|---|---|---|
| 2004/0047369 A1 | 3/2004 | Goel |
| 2012/0123774 A1 | 5/2012 | Choi et al. |
| 2019/0104073 A1 | 4/2019 | Choi et al. |
| 2020/0137615 A1* | 4/2020 | Joseph ................ H04W 24/02 |
| 2020/0322909 A1* | 10/2020 | Rácz .................... H04L 43/106 |
| 2021/0243771 A1* | 8/2021 | Mannweiler ...... H04W 28/0268 |
| 2021/0250787 A1* | 8/2021 | Kolding ............... H04L 47/283 |
| 2022/0014485 A1* | 1/2022 | Pocovi .................. H04L 1/187 |
| 2022/0030530 A1* | 1/2022 | Munz .................. H04J 3/0667 |
| 2022/0046462 A1* | 2/2022 | De Andrade Jardim ................... H04L 47/283 |
| 2023/0328002 A1* | 10/2023 | Finn ................... H04L 49/9036 370/235 |

* cited by examiner

PACKET TELEPHONY TERMINAL APPARATUS AND OPERATING METHOD THEREOF

CROSS-REFERENCE TO RELATED APPLICATION

This application claims priority to and the benefit of Korean Patent Application No. 10-2021-0011392 filed in the Korean Intellectual Property Office on Jan. 27, 2021, the entire contents of which are incorporated herein by reference.

BACKGROUND OF THE INVENTION (a) Field of the Invention

The present disclosure relates to a packet telephony terminal apparatus and an operating method thereof.

(b) Description of the Related Art

A time sensitive network (TSN) is primarily used in a local area network which is based on Ethernet bridging corresponding to a data link layer L2 of an OSI 7 layer reference model, a medium access control (MAC), and physical layer technology. The TSN is networking technology that provides low latency, low jitter, lossless transmission, and data transmission bandwidth guaranteeing in a short-range network. That is, the TSN is networking technology used in a time sensitive field such as factory automation, real-time control, remote control of an unmanned moving object, audio and video bridging, and remote surgery. International standard technology includes an IEEE TSN standard such as IEEE802.1Q, P60802 of IEEE for application to industrial automation, IEEE802.1DG for application of the TSN to the inside of a vehicle, a 5G system extension function standard of 3GPP for supporting IEEE TSN in a mobile environment such as 5G, and deterministic networking (DetNet) which is MPLS/IP-based TSN technology of IETF.

Meanwhile, in respect to packet telephony, technology evolution and standardization work in which after appearance of telephony communication service technology between PCs of VocalTec using the Internet first in the world in 1995, the telephony communication service technology spreads all communication networks including wired communication, WiFi communication, mobile communication, etc. Standard technology of the packet telephony includes H.323 and H.225.0 standards of ITU-T for setting and capability negotiation of a call in a connectionless packet communication network, a session initiation protocol (SIP) and a session description protocol (SDP) of IETF, a real-time transport protocol (RTP) and a real-time transport control protocol (RTCP) for real-time transmission of data in a user plane, and ITU-T G-series voice codec standards for effective encoding and decoding a voice in various communication networks. In addition, in respect to the standard technology of the packet telephony, various standards for execution and extension of a service such as a security, user authentication and registration, charging, a conference call, a display phone, etc., are developed.

As described above, the TSN and the packet telephony have been evolved to different individual technologies. But in recent years, the need for merging two technologies written above has been on the rise.

The above information disclosed in this Background section is only for enhancement of understanding of the background of the invention, and therefore it may contain information that does not form the prior art that is already known in this country to a person of ordinary skill in the art.

SUMMARY OF THE INVENTION

At least one exemplary embodiment of the exemplary embodiments may provide a packet telephony terminal apparatus and an operating method thereof which combine time sensitive network technology with a packet telephony service to enhance a quality of service (QoS) of a packet telephony.

At least one exemplary embodiment of exemplary embodiments provides a method in which a packet telephony terminal apparatus performing packet communication with a counterpart packet telephony terminal apparatus operates in an integrated network structure in which a time sensitive network (TSN) and a packet communication network are combined. The method may include: performing packet telephony call processing; performing a TSN stream reservation procedure when the counterpart packet telephony terminal apparatus is capable of performing a TSN function; adjusting a size of a dejitter buffer when the TSN stream reservation procedure is successful; and performing packet telephony communication through the adjusted size of the dejitter buffer.

The adjusting may include setting the size of the dejitter buffer to 0.

The performing of the packet telephony communication may include performing the packet telephony communication without using buffering.

The method may further include setting time synchronization in the TSN.

The setting the time synchronization may include performing synchronization with a grand master clock used in the TSN so that the packet telephony terminal apparatus becomes a slave to the TSN.

The method may further include checking whether the TSN is available or not when the packet telephony terminal apparatus is capable of performing the TSN function, and the setting of the time synchronization may include setting the time synchronization with the TSN when the TSN is available.

The TSN stream reservation procedure may be a procedure according to an IEEE802.1.Qcc specification, and the setting of the time synchronization may include IEEE1588 specification.

The performing of the TSN stream reservation procedure may include performing the TSN stream reservation procedure but one more times at a predetermined number of times when path reservation request corresponding to a quality of service parameter is unsuccessful.

Another exemplary embodiment may provide a packet telephony terminal apparatus performing packet communication with a counterpart packet telephony terminal apparatus in an integrated network structure in which a time sensitive network (TSN) and a packet communication network are combined. The packet telephony terminal apparatus may include: a codec unit encoding and decoding voice information; a real-time transport protocol (RTP)/real-time transport control protocol (RTCP) processing unit controlling an order for the encoded voice information; a packet telephony application control unit connected to the codec unit and the RTP/RTCP processing unit; and a TSN matching device performing a TSN stream reservation procedure together with the packet telephony application control unit, and setting time synchronization in the TSN.

The TSN matching device may include a TSN time synchronization unit with a grand master clock used in the TSN, and providing the time synchronization to the codec unit and the RTP/RTCP processing unit.

The packet telephony terminal apparatus may further include a dejitter buffer transmitting buffered data to the codec unit, and the TSN matching device may adjust a size of the dejitter buffer when the TSN stream reservation procedure is successful.

The size of the dejitter buffer may be 0.

The TSN matching device may further include a TSN parameter generation unit generating a parameter required for the TSN stream reservation procedure, and a TSN control plane interlocking unit performing the TSN stream reservation procedure together with the packet telephony application control unit by using the parameter.

The packet telephony application control unit may include a TSN path request counter storing a predetermined count value, and the packet telephony application control unit may try the TSN stream reservation procedure at a plurality of numbers of times according to the predetermined count value.

The TSN matching device may perform the TSN stream reservation procedure according to an IEEE802.1.Qcc specification, and the TSN matching device may set the time synchronization according to an IEEE1588 specification.

The TSN matching device may be connected to a physical layer of the integrated network.

Yet another exemplary embodiment may provide a method in which a packet telephony terminal apparatus connected to a TSN switch operates in an integrated network structure in which a plurality of time sensitive network (TSN) switches is positioned in part or in whole in a packet communication network The method may include: checking whether a counterpart packet telephony terminal apparatus to call is capable of performing a TSN function; setting time synchronization in a TSN when the counterpart packet telephony terminal apparatus is capable of performing the TSN function; and performing a TSN stream reservation procedure when the time synchronization is performed successfully in the TSN.

The setting of the time synchronization may include performing synchronization with a grand master clock used in the TSN to become a slave in the TSN.

The method may further include performing packet telephony communication without buffering when the TSN stream reservation procedure is successful.

According to at least one exemplary embodiment of the exemplary embodiments, a control plane of a packet telephony service and a TSN control plane can be organically connected through a TSN matching device.

According to at least one exemplary embodiment of the exemplary embodiments, a size of a dejitter buffer is adjusted to the minimum to achieve low latency.

According to at least one exemplary embodiment of the exemplary embodiments, a packet telephony terminal apparatus synchronized with a TSN to be a slave to the TSN to enable a packet telephony service using the TSN.

DETAILED DESCRIPTION OF THE EMBODIMENTS

Figure 1:
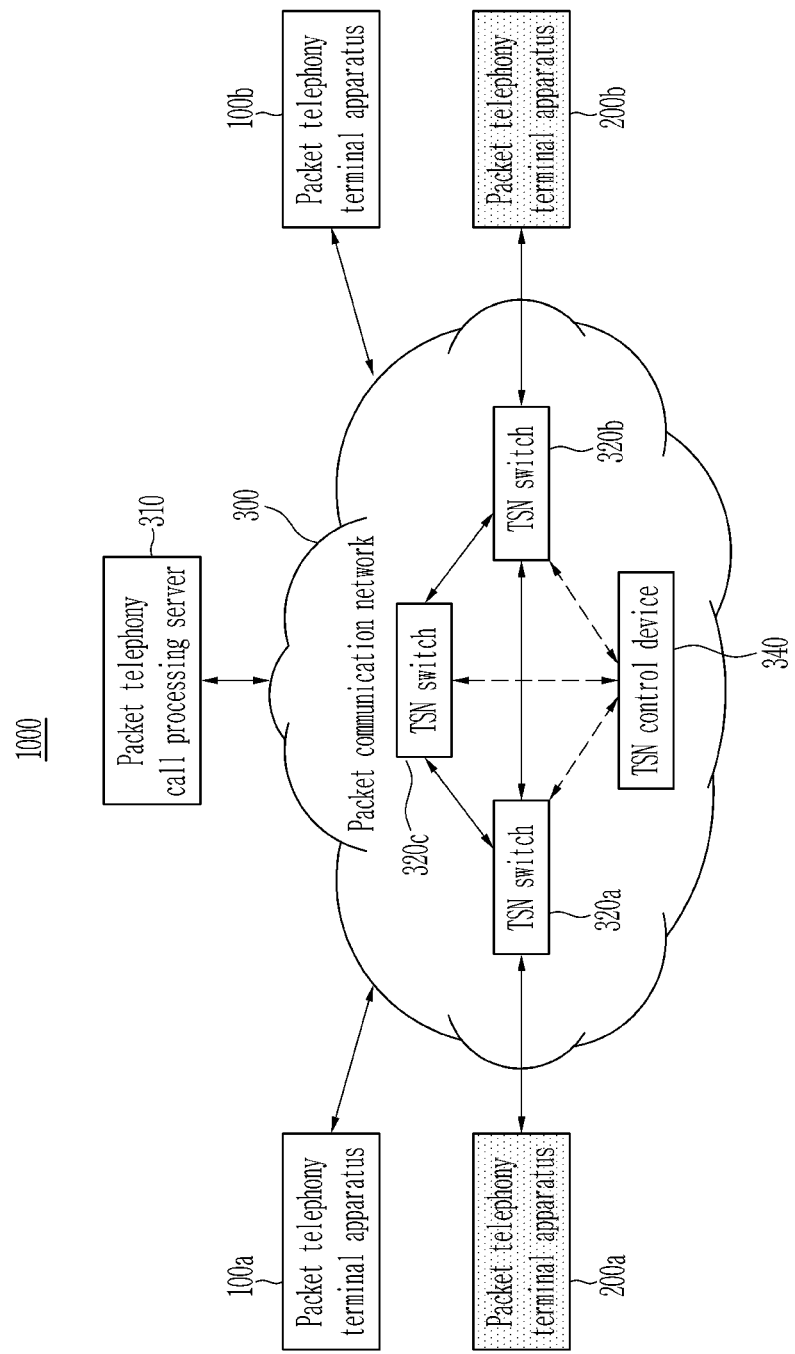
FIG. 1 is a diagram illustrating an integrated network structure in which a TSN and a packet communication network are combined according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a user equipment (UE) may be referred to as a mobile terminal (MT), a mobile station (MS), an advanced mobile station (AMS), a high reliability mobile station (HR-MS), a subscriber station (SS), a portable subscriber station (PSS), an access terminal (AT), etc., and also include all or some functions of the MT, the AMS, the HR-MS, the SS, the PSS, the AT, the UE, etc.

A base station (BS) may be referred to as an advanced base station (ABS), a high reliability base station (HR-BS), node B, evolved node B (eNodeB), an access point (AP), a radio access station (RAS), a base transceiver station (BTS), a mobile multihop relay (MMR)-BS, a relay station (RS) serving as the base station, a high reliability relay station (HR-RS) serving as the base station, etc., and also include all or some functions of the BS, the ABS, node B, eNodeB, the AP, the RAS, the BTS, the MMR-BS, the RS, the HR-RS, etc.

Further, a packet telephony terminal apparatus means all telephony terminal apparatuses using a packet transmission technique such as an Internet protocol (IP) in all or some sections of a communication path used for two or more telephony services.

FIG. 1 is a diagram illustrating an integrated network structure in which a TSN and a packet communication network are combined according to an exemplary embodiment.

As illustrated in FIG. 1, TSN technology may be integrated into a packet communication network 300. The TSN technology used in a time sensitive field such as real-time control of an automated factory and an application inside a vehicle may be incorporated into the packet communication network 300. Here, the packet communication network may be a mobile communication network such as 5G requiring low latency and high precision communication, a next-generation mobile communication network such as 5G+ and 6G, and a wired/wireless packet communication network such as an Internet network.

A packet telephony terminal apparatus 100a and a packet telephony terminal apparatus 100b performing general packet communication may be connected to the packet communication network 300. A packet telephony call processing server 310 may perform call processing for the general packet communication.

In addition, a plurality of TSN switches 320*a*, 320*b*, and 320*c* may be connected to each other, and the plurality of TSN switches 320*a*, 320*b*, and 320*c* may be positioned in part or in whole inside the packet communication network 300. A TSN control device 330 may also be positioned inside the packet communication network 300, and controls TSN signal processing for the plurality of TSN switches 320*a*, 320*b*, and 320*c*. In addition, a packet telephony terminal apparatus 200*a* may be connected to the TSN switch 320*a*, and a packet telephony terminal apparatus 200*b* may be connected to a TSN switch 320*b*. That is, the packet telephony terminal apparatuses 200*a* and 200*b* may be packet telephony terminal apparatuses that provide a low latency high-quality packet telephony service by applying the TSN technology.

TSN technology and general packet telephony technology are different from each other in an application system and a control plane structure, and a time synchronization scheme and need to thus match each other.

The TSN technology may use a control plane specification having a complicated structure such as IEEE802.1Qcc, in order to consider various types of time sensitive traffic characteristics and deliver lossless frames. Contrary to this, the general packet telephony technology may use H.323 and H.225.0 based control plane specifications of ITU-T or SIP and SDP based control plane specifications of IETF. As a result, a TSN matching device is required, which organically combines a control plane system and a TSN control plane system of the general packet telephony service. The TSN matching device may be included in the packet telephony terminal apparatuses 200*a* and 200*b*.

In addition, the TSN technology may synchronize the TSN switches 320*a*, 320*b*, and 320*c*, the TSN control device 330, and the packet telephony terminal apparatuses 200*a* and 200*b* with a grant master (GM) clock. Contrary to this, in the general packet telephony technology, the packet telephony terminal apparatus 100*a* and the packet telephony terminal apparatus 100*b* may synchronize with a time at a transmitting side acquired through a real-time transport protocol (RTP)/real-time transport control protocol (RTCP) procedure. As a result, in an exemplary embodiment described below, in order to match a transmission/reception timing of data, the packet telephony terminal apparatuses 200*a* and 200*b* may include a TSN matching device that synchronizes a slave with the grant master (GM) clock of the TSN.

Hereinafter, by referring to FIGS. 2 to 4, a packet telephony terminal apparatus 200 which organically combines the control plane system and the TSN control plane system of the packet telephony service and synchronizes with the grant master (GM) clock will be described. Hereinafter, by referring to FIGS. 2 to 4, a packet telephony terminal apparatus 200 which organically combines the control plane system and the TSN control plane system of the packet telephony service and synchronizes with the grant master (GM) clock will be described.

Figure 2:
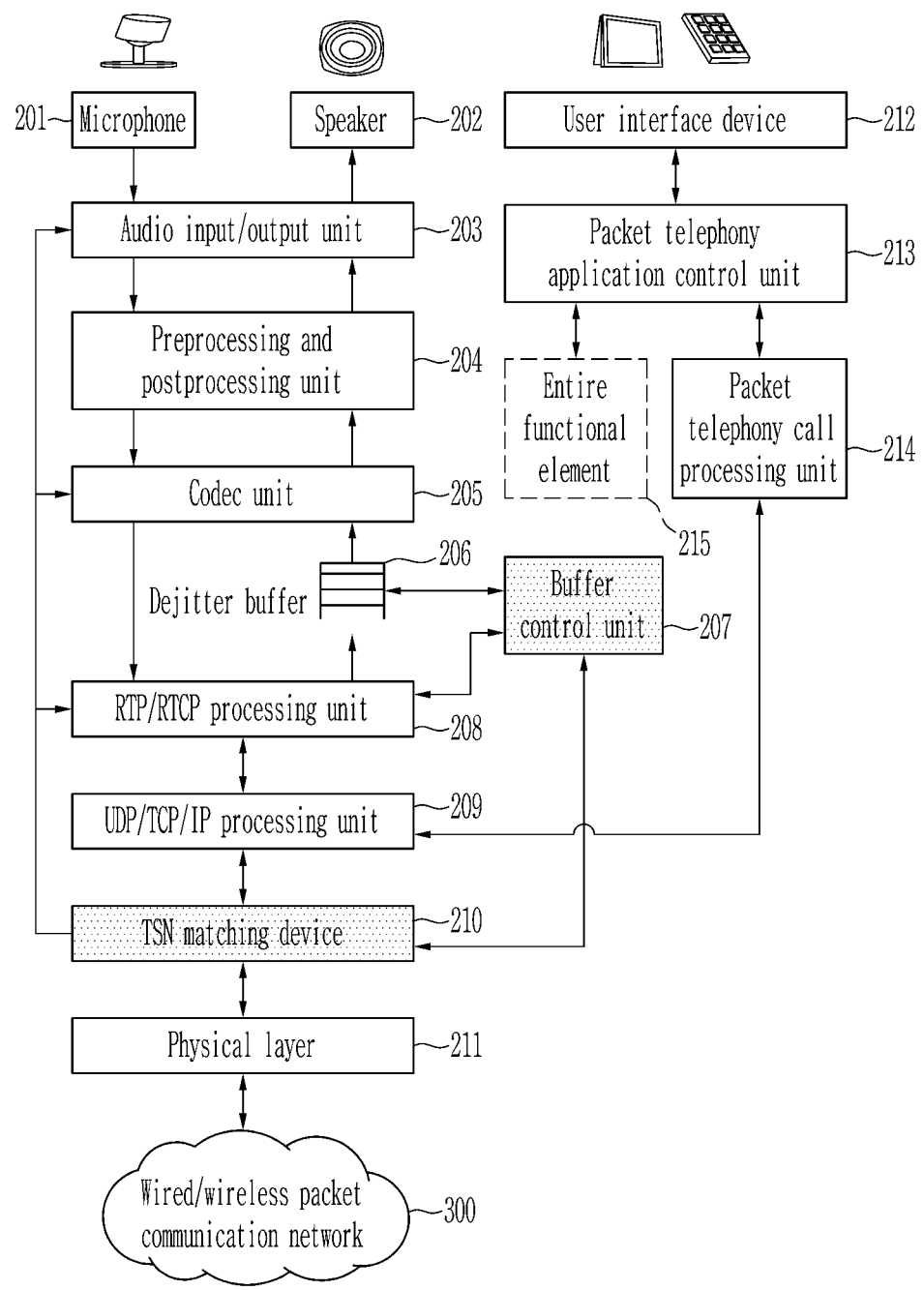
FIG. 2 is a block diagram illustrating a packet telephony terminal apparatus according to an exemplary embodiment.

FIG. 2 is a block diagram illustrating a packet telephony terminal apparatus 200 according to an exemplary embodiment.

The packet telephony terminal apparatus 200 in FIG. 2 may include a TSN matching device 210 for a low latency packet telephony, and further include a component for a general packet telephony.

As illustrated in FIG. 2, the packet telephony terminal apparatus 200 may include a microphone 201, a speaker 202, an audio input/output unit 203, a preprocessing and postprocessing unit 204, a codec unit 205, s dejitter buffer 206, a buffer control unit 207, an RTP/RTCP processing unit 208, a UDP/TCP/IP processing unit 209, a TSN matching device 210, a physical layer 211, a user interface device 212, a packet telephony application control unit 213, and a packet telephony call processing unit 214.

The microphone 201 may convert a voice of a user into digital information according to the control of the audio input/output unit 203. The microphone 201 may include a plurality of microphones in order to distinguish noise generated from an external environment of the user and a general voice. In addition, the speaker 202 may convert a digital signal of a counterpart voice into the voice according to the control of the audio input/output unit 203.

The preprocessing and postprocessing unit 204 may perform functions such as noise suppression, acoustic echo cancellation, and automatic level adjustment of a voice, in order to increase a user experience of a voice communication quality.

The codec unit 205 may encode voice information preprocessed by the preprocessing and postprocessing unit 204. In addition, the codec unit 205 may receive voice information encoded and sent by a terminal (packet telephony terminal apparatus) of a calling counterpart, and then decode the voice information. The codec unit 205 performs an important function to determine a quality of a packet telephony. Here, the codec unit 205 uses a standardized encoding and decoding rule. For example, G series codec standards (G.711, G.729a, G.711.1, G.729.1, G722.2, etc.) of the ITU-T may be used. Meanwhile, a codec for the packet telephony service may be determined through negotiation with the terminal of the calling counterpart by the packet telephony application control unit 213 and the packet telephony call processing unit 214

Meanwhile, in 4G(LTE) communication, an adaptive multi-rate wideband (AMR-WB) codec of 3GPP may be used, and a frame size of the AMR-WB codec may be 20 ms.

The RTP/RTCP processing unit 208 may control an order for the voice information encoded by the codec unit 205. In addition, the RTP/RTCP processing unit 208 may perform a function of confirming a sending subject of the voice information and maintaining a latency degree. Meanwhile, the RTP/RTCP processing unit 208 may operate to follow a change of a source clock of a transmitting end. That is, the RTP/RTCP processing unit 208 may read the dejitter buffer 206 by synchronizing with the source clock. Through this, overrun and underrun of the buffer may be prevented.

The buffer control unit 207 may control the dejitter buffer 206, and the buffer control unit 207 and the dejitter buffer 206 may perform a function of absorb latency variations which occur in the packet communication network. The buffer control unit 207 may control reading data of the dejitter buffer 206 according to the source clock of the transmitting end synchronized by the RTP/RTCP processing unit 208, and transmitting the read data to the codec unit 205. In the general packet communication network, the size of the dejitter buffer 206 may be set as large as in integer multiples of a frame size for a codec used by the codec unit 205. In addition, when the jitter is large, the size of the dejitter buffer 206 may be set to be two times to more times in integer multiples of the frame size of the codec in order to provide a stable service. Meanwhile, as described below, in order to guarantee the low latency service, the size of the dejitter buffer 206 according to an exemplary embodiment may be set to be smaller than the existing size (e.g., 0).

The user interface device 212 as a device supporting the packet telephony service may be, for example, a keypad or a display. That is, the user interface device 212 provides an access connection and control means to the user.

The packet telephony application control unit 213 may be physically or logically connected to an entire functional element 215 of the packet telephony terminal apparatus 200. The packet telephony application control unit 213 may perform functions related to the packet telephony service such as initialization, operation management, exceptional processing, and order execution of the service of the packet telephony terminal apparatus 200. Here, the entire functional element 215 corresponds to a component acquired by excluding the packet telephony application control unit 213 from all components of the packet telephony terminal apparatus 200.

The packet telephony call processing unit 214 may perform call setting and capability negotiation for connection of the packet telephony service in a non-connection type packet communication network. The packet telephony call processing unit 214 may perform a packet telephony call processing function by using the H.323 and H.225.0 standards of the ITU-T or the session initiation protocol (SIP) and session description protocol (SDP) standards of the IETF.

The user datagram protocol (UDP)/transmission control protocol (TCP)/Internet protocol (IP) processing unit may transmit/receive information processed by the packet telephony call processing unit 214 by using the TCP/IP. In addition, the UDP/TCP/IP processing unit may transmit/receive the information processed by the RTP/RTCP processing unit 208 by using the UDP/IP.

The TSN matching device 210 according to an exemplary embodiment may set the size of the dejitter buffer 206 to 0 (zero) through the buffer control unit 207 in a first condition. Here, the first condition is generally a case where the counterpart is a terminal (packet telephony terminal apparatus) capable of performing a TSN function, a TSN access is available, and path reservation in the TSN is successful. When at least one of the first conditions is not satisfied, the TSN matching device 210 may fix the size of the dejitter buffer 206 to a general size (e.g., one to 3 times of the frame size of the codec) through the buffer control unit 207. Further, when at least one of the first conditions is not satisfied, the TSN matching device 210 may vary the size of the dejitter buffer 206 through the buffer control unit 207 according to an estimated quality of the packet communication network. Meanwhile, the TSN matching device 210 may perform a medium access control function linked with a physical layer 211 of the wired/wireless packet communication network 300 according to whether the TSN access is poss. A specific configuration and operation description of the TSN matching device 210 will be described in more detail in FIGS. 3 and 4 below.

When the size of the dejitter buffer 206 is set to 2 (i.e., two times larger than the size of codec frame), minimum 40 ms (20 ms*2 frames) latency may occur during operation processes of the dejitter buffer 206 and the dejitter buffer control unit 207. Contrary to this, as in an exemplary embodiment, when the size of the dejitter buffer 206 is set to 0 in the first condition, minimum 40 ms latency may be removed, which occurs during the operation processes of the dejitter buffer 206 and the dejitter buffer control unit 207. For example, when a 23.85 kb/s mode is used, which sets guaranteeing of a bandwidth and definite latency provided by the TSN to 1 ms, and which is a maximum ratio of the codec among 9 modes (6.6 to 23.85 kb/s) of the AMR-WB codec, end-to-end latency of 44 ms or more may be shortened as compared with the legacy packet telephony.

Figure 3:
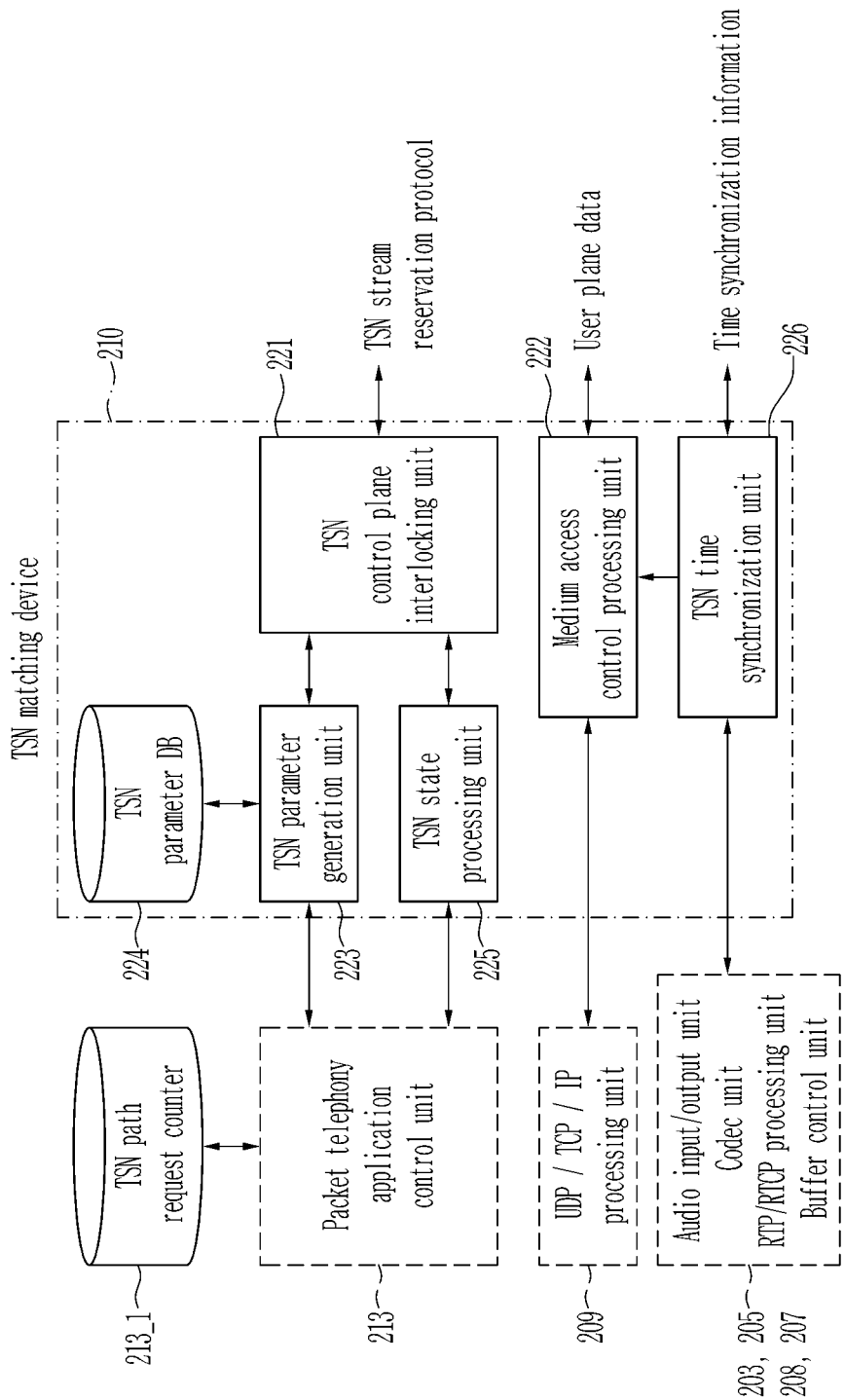
FIG. 3 is a block diagram illustrating a specific configuration of a TSN matching device according to an exemplary embodiment.

FIG. 3 is a block diagram illustrating a specific configuration of a TSN matching device 210 according to an exemplary embodiment. FIG. 3 illustrates even a connection relationship between an internal component of the TSN matching device 210 and another component of FIG. 2 together.

As illustrated in FIG. 3, the TSN matching device 210 according to an exemplary embodiment may include a TSN control plane interlocking unit 221, a medium access control processing unit 222, a TSN parameter generation unit 223, a TSN parameter database (DB) 224, a TSN state processing unit 225, and a TSN time synchronization unit 226.

The TSN matching device 210 may perform a stream reservation procedure requested for the low latency packet telephony service. To this end, the TSN control plane interlocking unit 221 may be connected to the TSN parameter generation unit 223 and the TSN state processing unit 225, and the TSN parameter generation unit 223 and the TSN state processing unit 225 may be connected to the packet telephony application control unit 213. Here, the TSN stream reservation procedure may follow the IEEE802.1.Qcc specification, and another technical specification or reservation scheme may be used. The TSN stream reservation procedure may be known by those skilled in the art in the technical field to which the present disclosure belongs, so a detailed description will be omitted.

The TSN parameter DB 224 stores a TSN parameter data structure shown in Table 1 below.

TABLE 1

| Classification | Attribute | TSN parameter | Classification | Attribute | TSN parameter |
| --- | --- | --- | --- | --- | --- |
| Transmitting terminal | Stream ID | MAC address + unique ID | Receiving terminal | Stream ID | MAC address + Unique ID |
| | Stream grade | Grade value | | Terminal interface | Interface ID |
| | Terminal interface | Interface ID | | User → network requirements | Seamless tree numbers |
| | Data frame | Transmission reception MAC address/PCP | | | Maximum latency |
| | | VLAN ID | | Interface capability | VLAN tag |
| | | Transmission/ reception IP address, version (V4/V6) | | | Stream classification type list |
| | | Transmission/ Reception port number | | | Sequence type list |

TABLE 1-continued

| Classification | Attribute | TSN parameter | Classification | Attribute | TSN parameter |
|---|---|---|---|---|---|
| | | DSCP | State information | Stream ID | Mac address + unique ID |
| | | Protocol | | State information | Transmitting terminal state (ready, fail) |
| Traffic specification | Traffic interval | | | | Receiving terminal state (ready. partial, fail) |
| | Maximum frame number per interval | | | | Fail code (insufficient bandwidth, etc.) |
| | Maximum frame size | | Accumulated latency | | Accumulated latency value |
| | Transmission selection | | Interface configuration | | Transmission/ reception MAC address/PCP |
| | Fastest/latest transmission offset | | | | VLAN ID |
| | Jitter | | | | Transmission/ reception IP address. Version (V4/V6) |
| User → network requirements | Seamless tree numbers | | | | DSCP |
| | Maximum latency | | | | Protocol |
| | | | | | Transmission/ reception port number |
| Interface capability | VLAN tag | | | | Time aware offset |
| | Stream classification list | | Unsuccessful interface | | Interface ID |
| | Sequence type list | | | | |

The TSN parameter generation unit 223 may generate TSN parameters from the TSN parameter DB 224 for control plane interlocking with the TSN (time sensitive network, the TSN switches 320a, 320b, and 320c in FIG. 2 and the TSN control device 330).

In Table 1, the TSN parameters may largely include a total of 40 parameters according to a transmitting terminal, a receiving terminal, and TSN state information between both terminals. The number of parameters related to the transmitting terminal may be 20, the number of parameters related to the receiving terminal may be 7, and the number of parameters related to the state information may be 13.

In Table 1, differentiated services field code points (DSCP) represents a priority of an IP packet and a priority code point (PCP) represent any one of class A traffic and class C traffic.

Meanwhile, the packet telephony application control unit 213 described in FIG. 2 above may include a TSN path request counter 213_1. A predetermined counter value is set in the TSN path request counter 213_1. The predetermined counter value may indicate the number of retry times when path reservation capable of providing requested service quality parameters (e.g., a traffic specification of Table 1, i.e., a traffic interval, the maximum number of frames per interval, a maximum frame size, a maximum latency time, an allowable jitter range, etc.) is unsuccessful when the TSN control plane interlocking unit 221 performs the TSN stream reservation protocol together with (interlocking with) the TSN control device 330 (illustrated in FIG. 1). That is, when the TSN control device 330 may not discover a path capable of definitely guaranteeing the maximum latency requested due to an increased load of the TSN, the TSN control plane interlocking unit 221 may try a procedure for the generation of the TSN parameter and the interlocking of the TSN control device 330 according to the predetermined counter value. Here, when the counter value is set to 2, 1 second may be used as a waiting time for retry. In addition, when the counter value is 2, the TSN control plane interlocking unit 221 may perform the procedure for the generation of the TSN parameter and the interlocking of the TSN control device 330 up to two times.

The TSN state processing unit 225 provides the state information of the TSN for smooth packet telephony service control to the packet telephony application control unit 213 and delivers control information required for state processing, by interlocking with the TSN control plane interlocking unit 221. That is, the TSN state processing unit 225 may perform processing for a state (fail, partial, and ready) of the transmitting/receiving terminal executing the packet telephony service, accumulated latency value processing, etc. Two states, i.e., ready and fail are managed commonly for the transmitting and receiving terminals, and the state called partial is additionally managed in a receiving port. The ready means a normal state, and the fail includes a situation in which the packet telephony service is impossible, such as a poor communication line, cutting of a cable, or stop of power supply. The state such as the partial in the receiving port means a state in which the fail such as cable rupture occurs in not an entire communication section but a partial section when the TSN control plane interlocking unit 221 uses multi paths for lossless transmission. As one example, it may be configured that when the fail status occurs in a half or more of the total number of sections (nodes), it is determined that normal service connection is difficult and end processing may be performed. The accumulated latency value is used for periodically monitoring a service quality, and when accumulation latency capable of maintaining the service quality of the packet telephony exceeds a maximum allowance value (e., an accumulation value of the maximum latency among the transmitting terminal parameters), the service may be stopped.

The medium access control (MAC) processing unit 222 may perform generation (transmission) and reception processing for a medium access control packet with the TSN or the packet communication network. In addition, when the TSN access is not available, the medium access control processing unit 222 may perform medium access control packetization and depacketization operations according to a general packet telephony service procedure together with the UDP/TCP/IP processing unit 209.

The TSN time synchronization unit 226 may interlock with the TSN switches 320a, 320b, and 320c, and the TSN control device 330, and perform a function of matching a time offset with the grand mater (GM) clock used in the TSN. That is, the TSN time synchronization unit 226 may perform time synchronization to become the slave of the grand master clock of the TSN. Here, a time synchronization procedure performed by the TSN time synchronization unit 226 may be performed according to IEEE1588 specification. The time synchronization procedure of the IEEE1588 may be known by those skilled in the art in the technical field to which the present disclosure belongs, so a detailed description will be omitted. A synchronization level may be 125 microseconds ($\frac{1}{8000}$ seconds) and 66.5 microseconds ($\frac{1}{16000}$ seconds) to correspond to both 8000 Hz (when using a narrow codec) and 16000 Hz (when using a wideband codec) which are sampling clocks used in the packet telephony, respectively. Meanwhile, the TSN time synchronization unit 226 may provide the time synchronization to the audio input/output unit 203, the codec unit 205, and the RTP/RTCP processing unit 208. In addition, in the first condition (in the case where the counterpart is generally the terminal performing the TSN function, the TSN access is available, and the path reservation in the TSN is successful) described in FIG. 2 above, data transmission/reception is performed while synchronizing with a time provided by the TSN time synchronization unit 226 instead of a transmission clock by the RTP/RTCP processing unit 208.

Figure 4:
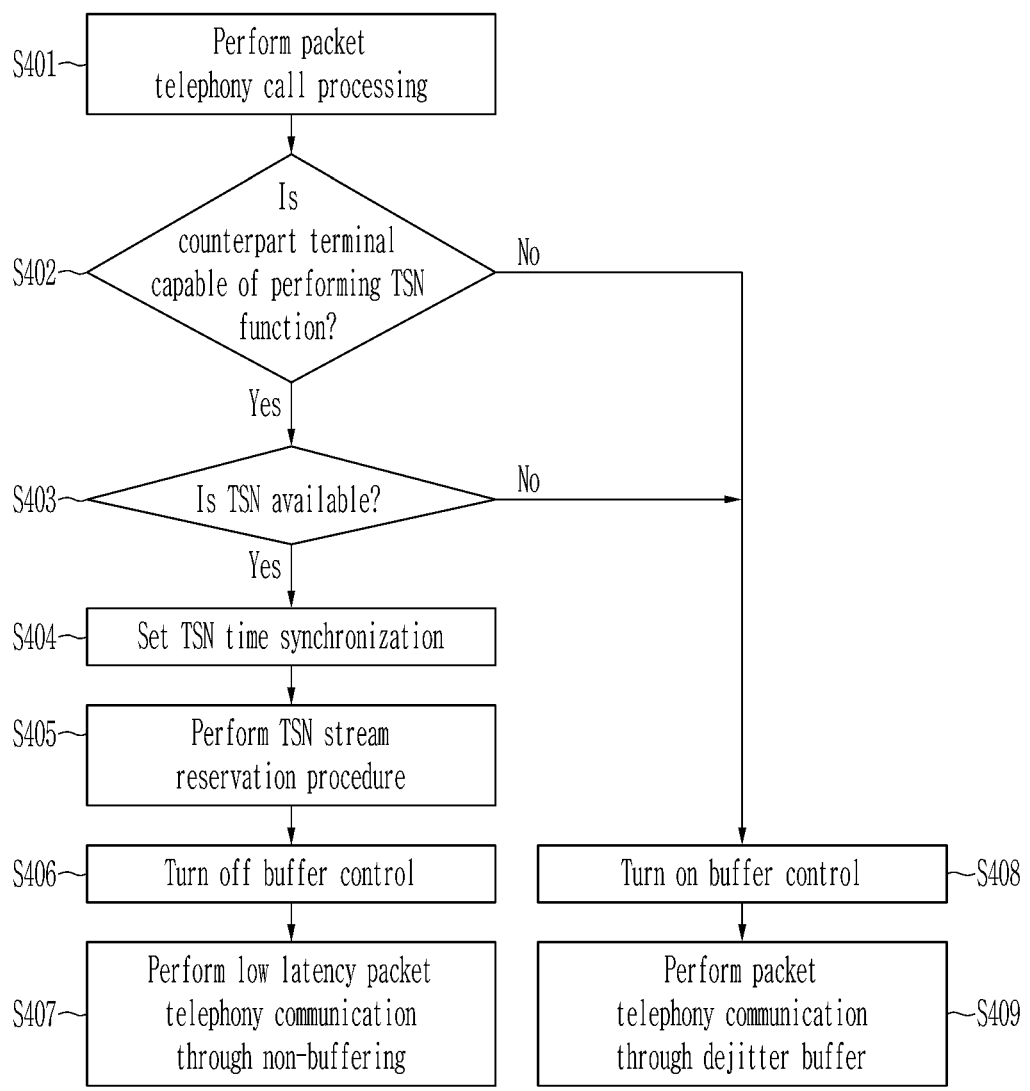
FIG. 4 is a flowchart illustrating a method for performing, by a packet telephony terminal apparatus, time sensitive networking matching for a low latency packet telephony according to an exemplary embodiment.

FIG. 4 is a flowchart illustrating a method for performing, by a packet telephony terminal apparatus 200, time sensitive networking matching for a low latency packet telephony according to an exemplary embodiment.

The packet telephony terminal apparatus 200 performs a general packet telephony call processing in response to a call setting request from a user (S401). The packet telephony call processing may be performed by the packet telephony call processing unit 214 of the packet telephony terminal apparatus 200. As one example, call processing may be performed according to an H.323 standard and an H.225.0 standard or SIP and SDP standards. Here, when call setting is successful, the type of codec to be used for the packet telephony and options of media to be used may be confirmed (e.g., codec=G.722.2, bit rate=23.85 kb/s, in case of G.711, u-law/A-law).

The packet telephony terminal apparatus 200 checks whether a counter terminal (a packet telephony terminal apparatus which becomes a calling counterpart) is a terminal capable of performing a TSN function (S402). Determining whether the TSN may be performed for the counter terminal may be checked through a method using a predetermined table according to a telephone number or an e-mail address and a capability negotiation procedure during the packet telephony call processing. For example, whether the TSN may be performed for the counterpart terminal may be determined through an inquiry for inquiring a TSN capability to the counterpart terminal.

When the counterpart terminal may perform the TSN function in step S402 above, the packet telephony terminal apparatus 200 checks whether the TSN is available (usable) (S403). The TSN control plane interlocking unit 221 of the TSN matching device 210 may check whether the TSN is available by performing the TSN stream reservation protocol by interlocking with the packet telephony application control unit 213. Meanwhile, when the packet telephony terminal apparatus 200 subscribed in a specific TSN service provider and registration is completed, the packet telephony application control unit 213 may omit step S403 above.

In step S403 above, when the TSN is available, the packet telephony terminal apparatus 200 sets TSN time synchronization (S404). The TSN time synchronization unit 226 of the TSN matching device 210 may perform synchronization with the grant master (GM) clock used in the TSN. In this case, the TSN time synchronization unit 226 may perform time synchronization to become the slave of the TSN. By such synchronization setting, the operations of the audio input/output unit 203, the codec unit 205, and the RTP/RTCP processing unit 208 may also be synchronized. Medium access control data transmitted by the medium access control processing unit 222 may also be transmitted according to a synchronized time. In addition, since reception of the medium access control data is synchronized with the time, the size of the dejitter buffer 206 may be set to 0.

When the time synchronization is completed in step S404, the packet telephony terminal apparatus 200 performs the TSN stream reservation procedure (S405). That is, the TSN control plane interlocking unit 221 of the TSN matching device 210 may perform the TSN stream reservation protocol interlocking with the TSN control device 330 (illustrated in FIG. 1). Here, the TSN control plane interlocking unit 221 may perform the procedure for the generation of the TSN parameter and the interlocking of the TSN control device 330 up to the number of times corresponding to a value set by the TSN path request counter 213_1.

When TSN stream reservation is successful in step S405 above, the packet telephony terminal apparatus 200 turns off buffer control (S406). That is, the TSN matching device 210 may set the size of the dejitter buffer 206 to 0 (zero) through the buffer control unit 207.

When the buffer control is turned off in step S406 above, the packet telephony terminal apparatus 200 performs low latency packet telephony communication through non-buffering (S407). Here, since the size of the dejitter buffer 206 is set to 0, latency by buffering may be minimized.

Meanwhile, when the counterpart terminal may not perform the TSN function in step S402 above or when the TSN is not available in step S403 above, the packet telephony terminal apparatus 200 turns off the buffer control (S408). That is, the TSN matching device 210 may set the size of the dejitter buffer 206 to a general size (e.g., one to three times larger than the frame size of the codec) through the buffer control unit 207.

In addition, when the buffer control is turned on in step S409 above, the packet telephony terminal apparatus 200 performs general packet telephony communication through the dejitter buffer (S409).

Figure 5:
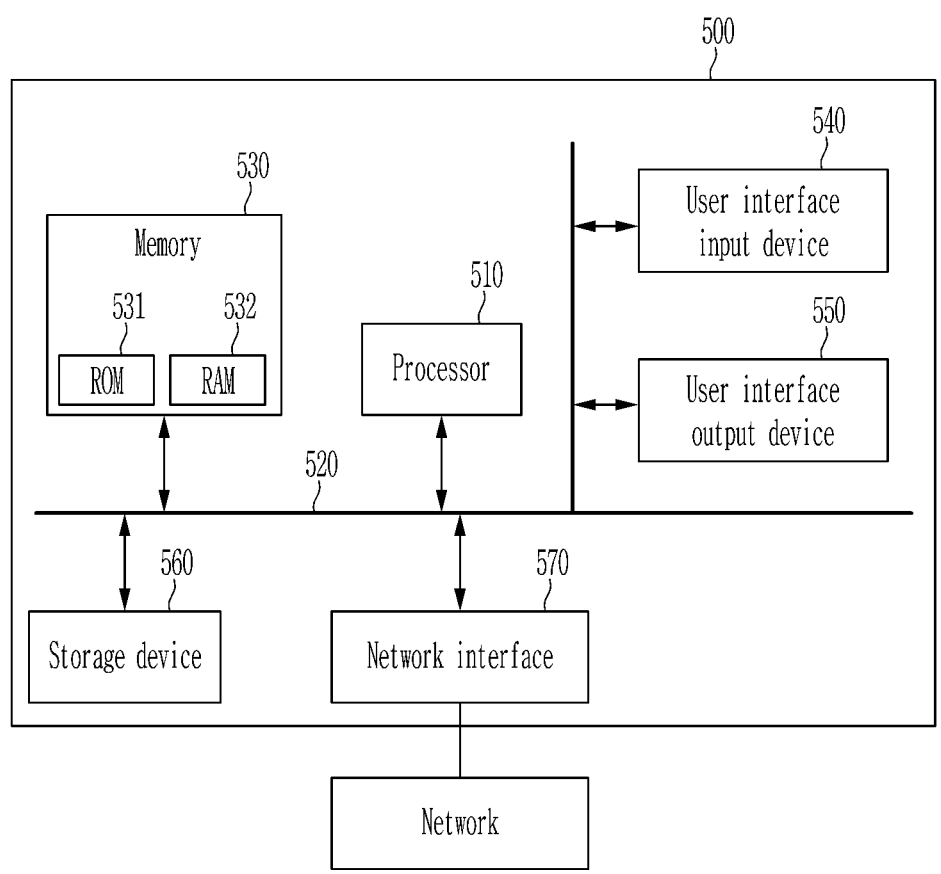
FIG. 5 is a diagram illustrating a computing system according to an exemplary embodiment.

FIG. 5 is a diagram illustrating a computing system according to an exemplary embodiment.

A computing system 500 of FIG. 5 may be each component described in FIGS. 2 and 3. That is, the computing system 500 may become the components of each of the packet telephony terminal apparatus and the TSN matching device described in FIGS. 2 and 3. Each component may be implemented by the computing system, e.g., a computer-readable medium.

The computing system 500 may include at least one of a processor 510, a memory 530, an user interface input device 540, an user interface output device 550, and a storage device 560 which communicate through a bus 520. The computing system 500 may also include a network interface 570 combined to a network. The network interface 570 may transmit or receive a signal to/from another entity through the network.

The processor 510 may be a central processing unit (CPU), or a semiconductor device executing a command stored in the memory 530 or the storage device 560. The processor 510 may be configured to implement the functions, the methods, and the protocols described in FIGS. 1 to 4.

The memory 530 and the storage device 560 may be various types of volatile or non-volatile storage media. For example, the memory may include a read-only memory (ROM) 531 and a random access memory (RAM) 532. In an exemplary embodiment, the memory 530 may be positioned inside or outside the processor 510 and the memory 530 may be connected to the processor 510 by various previously known means.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method in which a packet telephony terminal apparatus performing packet communication with a counterpart packet telephony terminal apparatus operates in an integrated network structure in which a time sensitive network (TSN) and a packet communication network are combined, the method comprising:
performing packet telephony call processing;
performing a TSN stream reservation procedure when the counterpart packet telephony terminal apparatus is capable of performing a TSN function;
adjusting a size of a dejitter buffer when the TSN stream reservation procedure is successful; and
performing packet telephony communication through the adjusted size of the dejitter buffer.

2. The method of claim 1, wherein:
the adjusting includes setting the size of the dejitter buffer to 0.

3. The method of claim 2, wherein:
the performing of the packet telephony communication includes performing the packet telephony communication without using buffering.

4. The method of claim 1, further comprising:
setting time synchronization in the TSN.

5. The method of claim 4, wherein:
the setting the time synchronization includes performing synchronization with a grand master clock used in the TSN so that the packet telephony terminal apparatus becomes a slave to the TSN.

6. The method of claim 4, further comprising:
checking whether the TSN is available or not when the packet telephony terminal apparatus is capable of performing the TSN function,
wherein the setting of the time synchronization includes setting the time synchronization with the TSN when the TSN is available.

7. The method of claim 4, wherein:
the TSN stream reservation procedure is a procedure according to an IEEE802.1.Qcc specification, and
the setting of the time synchronization includes setting the time synchronization according to an IEEE1588 specification.

8. The method of claim 1, wherein:
the performing of the TSN stream reservation procedure includes performing the TSN stream reservation procedure but one more times at a predetermined number of times when path reservation request corresponding to a quality of service parameter is unsuccessful.

9. A packet telephony terminal apparatus performing packet communication with a counterpart packet telephony terminal apparatus in an integrated network structure in which a time sensitive network (TSN) and a packet communication network are combined, comprising:
a codec unit encoding and decoding voice information;
a real-time transport protocol (RTP)/real-time transport control protocol (RTCP) processing unit controlling an order for the encoded voice information;
a packet telephony application control unit connected to the codec unit and the RTP/RTCP processing unit; and
a TSN matching device performing a TSN stream reservation procedure together with the packet telephony application control unit, and setting time synchronization in the TSN.

10. The packet telephony terminal apparatus of claim 9, wherein:
the TSN matching device includes a TSN time synchronization unit setting the time synchronization with a grand master clock used in the TSN, and providing the time synchronization to the codec unit and the RTP/RTCP processing unit.

11. The packet telephony terminal apparatus of claim 10, wherein:
the TSN matching device further includes,
a TSN parameter generation unit generating a parameter required for the TSN stream reservation procedure, and
a TSN control plane interlocking unit performing the TSN stream reservation procedure together with the packet telephony application control unit by using the parameter.

12. The packet telephony terminal apparatus of claim 11, wherein:
the packet telephony application control unit includes a TSN path request counter storing a predetermined count value, and
the packet telephony application control unit tries the TSN stream reservation procedure at a plurality of numbers of times according to the predetermined count value.

13. The packet telephony terminal apparatus of claim 9, further comprising:
a dejitter buffer transmitting buffered data to the codec unit,
wherein the TSN matching device adjusts a size of the dejitter buffer when the TSN stream reservation procedure is successful.

14. The packet telephony terminal apparatus of claim 13, wherein:
the size of the dejitter buffer is 0.

15. The packet telephony terminal apparatus of claim 9, wherein:
the TSN matching device performs the TSN stream reservation procedure according to an IEEE802.1.Qcc specification, and
the TSN matching device sets the time synchronization according to an IEEE1588 specification.

16. The packet telephony terminal apparatus of claim 9, wherein:
the TSN matching device is connected to a physical layer of the integrated network.

17. A method in which a packet telephony terminal apparatus connected to a TSN switch operates in an integrated network structure in which a plurality of time sensitive network (TSN) switches is positioned in part or in whole in a packet communication network, the method comprising:

checking whether a counterpart packet telephony terminal apparatus to call is capable of performing a TSN function;
setting time synchronization in a TSN when the counterpart packet telephony terminal apparatus is capable of performing the TSN function; and
performing a TSN stream reservation procedure when the time synchronization is performed successfully in the TSN.

18. The method of claim 17, wherein:
the setting of the time synchronization includes performing synchronization with a grand master clock used in the TSN to become a slave in the TSN.

19. The method of claim 18, further comprising:
performing packet telephony communication without buffering when the TSN stream reservation procedure is successful.

\* \* \* \* \*